Oct. 29, 1957     A. A. BJORK     2,811,633
SAFETY BICYCLE LIGHT
Filed Aug. 3, 1956
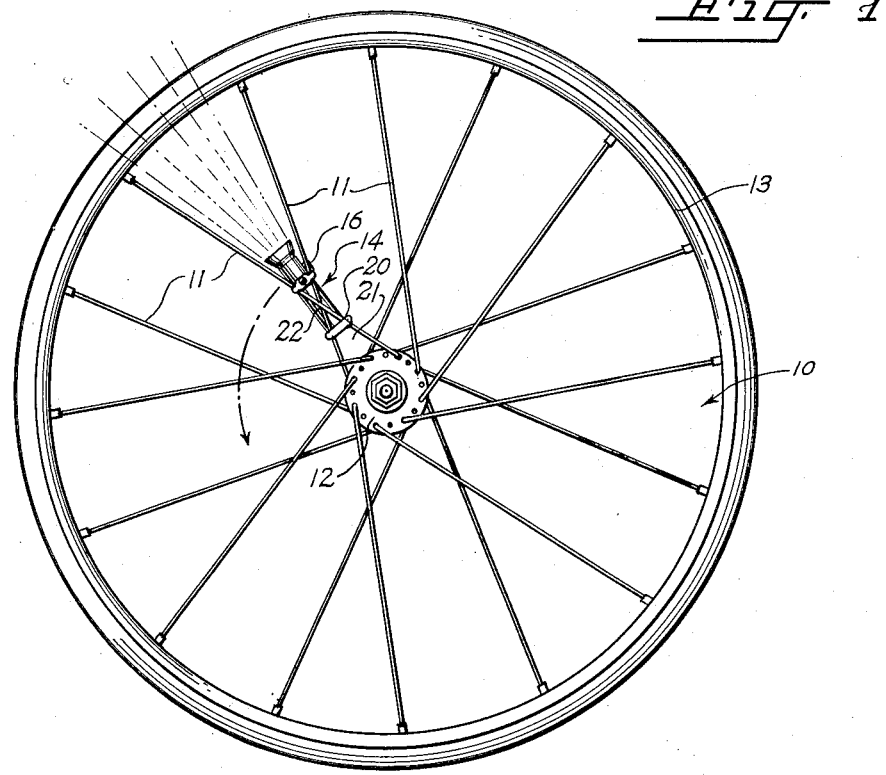
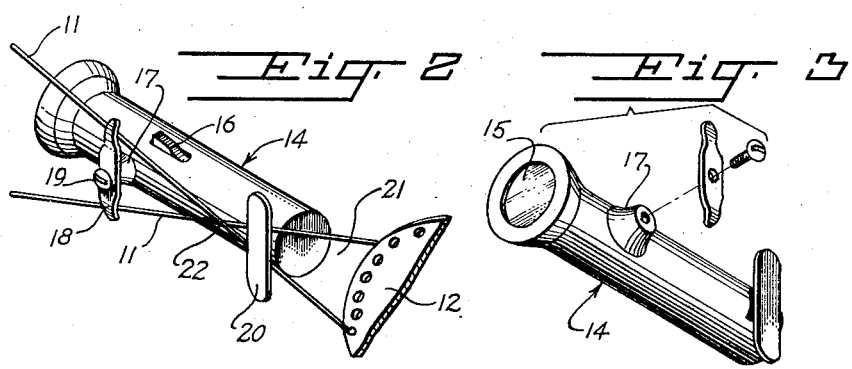
INVENTOR.
Albin A. Bjork
BY
Christian R. Nielsen
Attorney

United States Patent Office 2,811,633
Patented Oct. 29, 1957

2,811,633

SAFETY BICYCLE LIGHT

Albin A. Bjork, Ashland, Wis.

Application August 3, 1956, Serial No. 602,040

1 Claim. (Cl. 240—7.55)

This invention relates to a bicycle light and it consists in the constructions, arrangements and combinations herein described and claimed.

It is the cardinal object of the invention to provide a lighting structure in the form of a flashlight which may be securely mounted upon a wheel of a bicycle in such manner that the light will be carried around in a circular path upon rotation of the wheel.

More specifically, it is an object of the invention to provide a safety light for a bicycle in the form of a miniature flashlight, the casing of which includes a pair of spaced means for securing the flashlight between a pair of spokes of a bicycle wheel and securely retain the same for rotation with the wheel, thereby clearly indicating the direction of travel of a bicycle.

Additional objects, advantages and features of invention will be apparent from the following description, considered in conjunction with the accompanying drawing, wherein, Figure 1 is a side elevation of a bicycle wheel having the flashlight installed between a pair of spokes of the wheel.

Figure 2 is an enlarged perspective view of the light as installed upon a pair of crossed spokes of a wheel, and Figure 3 is a perspective view of the flashlight disassembled from the wheel.

There is illustrated a bicycle wheel 10 of conventional construction, embodying a plurality of cross spokes 11 which are secured between the hub 12 of the wheel and the rim 13 thereof. As is well understood, the hub 12 is of much greater width than the rim 13 so that the spokes upon opposite sides of the hub will be spaced apart a greater distance than at the rim, and this spaced distance of the spokes provides ample room for mounting a lighting means, such as the flashlight 14 between the spokes at opposite sides of the wheel.

The flashlight 14 is of the miniature type, of conventional construction and will include an encased battery and bulb (not shown), a bull's-eye 15 and a switch 16.

Upon a forward portion of the case of the flashlight, a boss 17 is provided having a bore interiorly threaded and complemental to the bore there is a saddle 18 having an opening medially of the length thereof for receiving a fastening means such as a screw or wing bolt 19. The saddle is of such length as to straddle a pair of spokes 11 when arranged transversely thereof. At the rear end of the flashlight casing, a metallic strap 20 is secured, extending transversely of the casing, which likewise straddles the pair of spokes 11.

To apply the flashlight to the spokes of a bicycle wheel, the flashlight 10 is presented interiorly behind the spokes upon one side of the rim 13, the strap 20 being presented between the spokes 11 and then moved outwardly along the spokes until the plate has moved closely to the crossed portions 22 of the spokes. The screw or wing bolt 19 having been loosened, the saddle 18 is moved transversely across the spokes so as to straddle the same and the screw or bolt 19 is then tightened drawing the saddle securely upon the spokes.

In use, with the flashlight 10 secured upon a pair of spokes, the flashlight will be carried around with the wheel under rotation thereof and will readily indicate the direction of travel of the bicycle, as well as to more readily appraise traffic of the cyclist's presence than a stationary light structure.

While I have shown and described a preferred form of the invention, this is by way of illustration only, and I consider as my own all such modifications in construction as fairly fall within the scope of the appended claim.

I claim:

The combination of a bicycle wheel and a safety light therefor comprising a miniature flashlight including a casing, a transverse strap fixed to said casing, a threaded boss on said casing spaced from said strap, said flashlight being positioned between the spokes at opposite sides of the wheel, said transverse strap engaging a pair of crossed spokes of the wheel and positioned on the outer surfaces of said spokes and a saddle carried by said boss and including a fastening means for drawing said saddle securely upon said spokes adjacent the crossed portion of the spokes.

References Cited in the file of this patent

FOREIGN PATENTS

| | | |
|---|---|---|
| 978,808 | France | Nov. 29, 1950 |
| 1,068,313 | France | Feb. 3, 1954 |